US012717445B2

(12) United States Patent
Long et al.

(10) Patent No.: US 12,717,445 B2
(45) Date of Patent: Aug. 25, 2026

(54) TOUCH SYSTEMS USING NEAR INFRARED FILMS

(71) Applicant: 3M INNOVATIVE PROPERTIES COMPANY, St. Paul, MN (US)

(72) Inventors: Fan Long, Guangzhou (CN); Edward S. Hagermoser, Lancaster, MA (US); Bharat R. Acharya, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 3 days.

(21) Appl. No.: 18/292,045

(22) PCT Filed: Jul. 25, 2022

(86) PCT No.: PCT/IB2022/056849

§ 371 (c)(1),
(2) Date: Jan. 25, 2024

(87) PCT Pub. No.: WO2023/007355

PCT Pub. Date: Feb. 2, 2023

(65) Prior Publication Data

US 2025/0044888 A1 Feb. 6, 2025

Related U.S. Application Data

(60) Provisional application No. 63/226,855, filed on Jul. 29, 2021.

(51) Int. Cl.
*G06F 3/042* (2006.01)
*G06F 3/041* (2006.01)

(52) U.S. Cl.
CPC .......... *G06F 3/0421* (2013.01); *G06F 3/0412* (2013.01); *G06F 3/0425* (2013.01)

(58) Field of Classification Search
CPC .... G06F 3/0421; G06F 3/0412; G06F 3/0425; G06F 3/042
See application file for complete search history.

(56) References Cited

U.S. PATENT DOCUMENTS 9,836,165 B2 12/2017 Nho et al.
11,054,556 B2 7/2021 Wheatley et al.
(Continued)

FOREIGN PATENT DOCUMENTS

CN 115698918 A * 2/2023 ............. H10K 59/65
WO WO-2022053904 A1 * 3/2022 ............. H10K 59/65

OTHER PUBLICATIONS

International Preliminary Report on Patentability, PCT/IB2022/056849, Jan. 18, 2024. (Year: 2024).*
(Continued)

*Primary Examiner* — Julie Anne Watko
(74) *Attorney, Agent, or Firm* — Jonathan L. Tolstedt

(57) ABSTRACT

A display system includes a substrate, an optically reflecting first film defining a plurality of first openings across a length and a width of the first major surface, pluralities of visible light emitting first devices, infrared light emitting second devices, and infrared light detecting third devices disposed in the first openings of the first film and mounted on the substrate, and an optically reflecting second film disposed on the pluralities of first, second, and third devices and the optically reflecting first film opposite the substrate. For a visible wavelength range and an infrared wavelength range, the first film has an average reflectance of greater than about 60% for each of the visible and infrared wavelength ranges, and the second film has an average reflectance of greater than about 60% for the visible wavelength range and an average transmittance of greater than about 50% for the infrared wavelength range.

20 Claims, 6 Drawing Sheets

(56) References Cited

U.S. PATENT DOCUMENTS

2018/0158877 A1 6/2018 Zeng et al.
2022/0091316 A1* 3/2022 Long .................... G02B 5/0205
2023/0228919 A1* 7/2023 Sousa ...................... G02B 1/04
359/599

OTHER PUBLICATIONS

Written Opinion of the International Searching Authority, PCT/IB2022/056849, Oct. 26, 2022. (Year: 2022).*
International Search Report for PCT Application No. PCT/IB2022/056849, mailed on Oct. 26, 2022, 4 pages.

* cited by examiner

Average Transmission Percentages, First Film 20

| | xTp0 | yTp0 | xTp60 | yTp60 |
|---|---|---|---|---|
| 420-680: | 0.59 | 0.44 | 0.48 | 0.23 |
| 850-1200: | 20.56 | 17.65 | 79.50 | 37.96 |
| 700-900: | 0.89 | 0.50 | 2.91 | 0.04 |
| 850-1050: | 1.00 | 0.66 | 66.10 | 22.90 |

Average Transmission Percentages, Second Film 60

| | xTp0 | yTp0 | xTp60 | yTp60 |
|---|---|---|---|---|
| 420-680: | 0.42 | 0.50 | 0.43 | 0.56 |
| 850-1200: | 84.41 | 85.92 | 60.16 | 97.96 |
| 700-900: | 19.91 | 23.62 | 47.59 | 94.80 |
| 850-1050: | 82.82 | 85.09 | 59.92 | 97.79 |

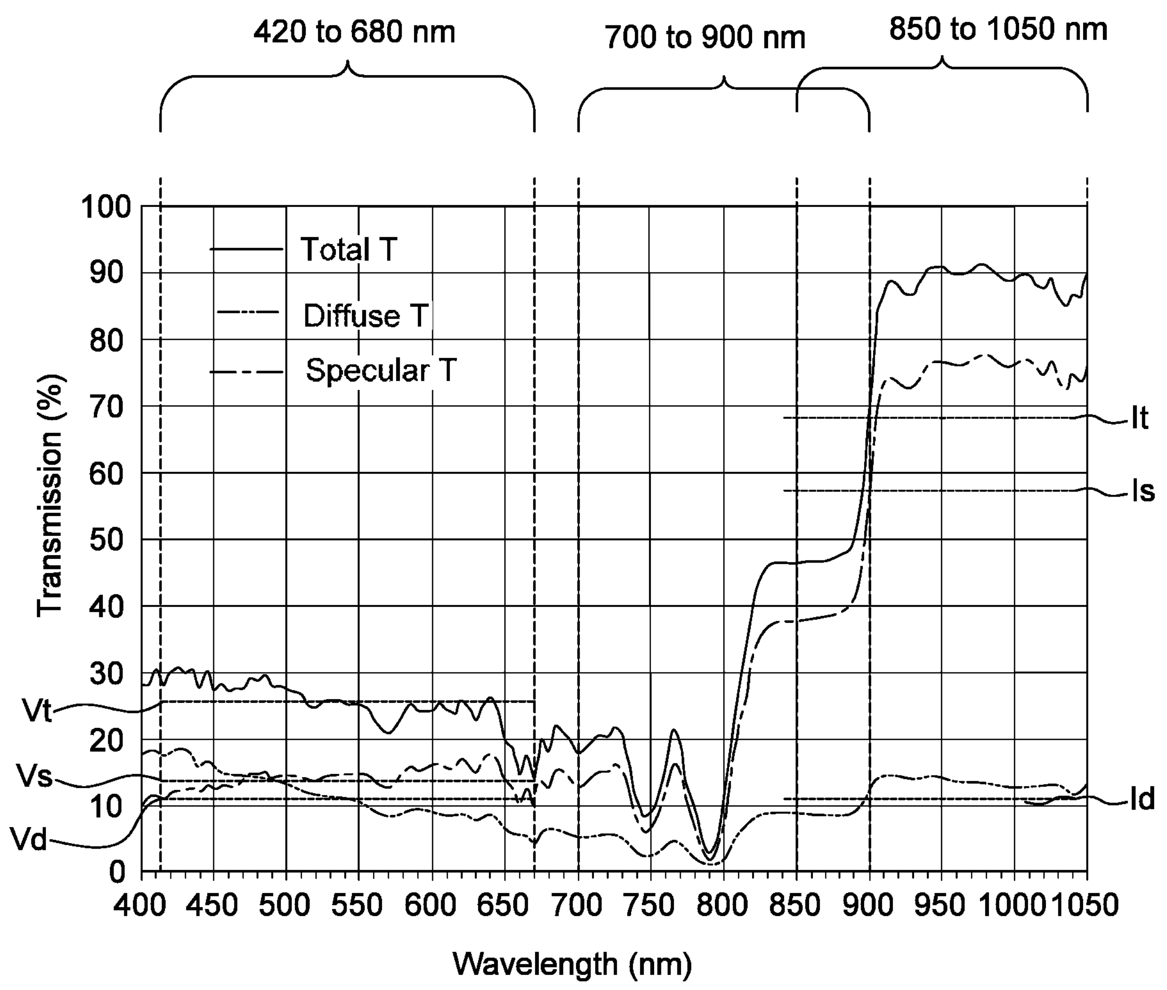
FIG. 6A
| | Total T | Diffuse T | Specular T |
|---|---|---|---|
| 420-680: | 24.83 | 10.88 | 13.95 |
| 850-1050: | 69.93 | 11.22 | 58.71 |
| 700-900: | 29.06 | 5.93 | 23.14 |
FIG. 6B

| | Total T | Diffuse T | Specular T |
|---|---|---|---|
| 420-680: | 65.51 | 53.69 | 11.82 |
| 850-1050: | 85.09 | 24.85 | 60.24 |
| 700-900: | 80.32 | 35.83 | 44.49 |

TOUCH SYSTEMS USING NEAR INFRARED FILMS

CROSS REFERENCE TO RELATED APPLICATIONS

This application is a national stage filing under 35 U.S.C. 371 of PCT/IB2022/056849, filed Jul. 25, 2022, which claims the benefit of U.S. Provisional Application No. 63/226,855, filed Jul. 29, 2021, the disclosures of which are incorporated by reference in their entireties herein.

SUMMARY

In some aspects of the present description, a display system is provided, the display system including a substrate, an optically reflecting first film, pluralities of visible light emitting first devices, infrared light emitting second devices, and infrared light detecting third devices, and an optically reflecting second film. The optically reflecting first film is disposed on a first major surface of the substrate and defines a plurality of spaced apart first openings therein arranged across a length and a width of the first major surface. The pluralities of visible light emitting first devices, infrared light emitting second devices, and infrared light detecting third devices are disposed in the first openings of the first film and mounted on the substrate. The optically reflecting second film is disposed on the pluralities of first, second, and third devices and the optically reflecting first film opposite the substrate. For a visible wavelength range extending from about 420 nm to about 680 nm and an infrared wavelength range extending from about 850 nm to about 1050 nm: each of the first devices is configured to emit a first light having at least a first wavelength not in the infrared wavelength range, each of the second devices is configured to emit a second light having at least a first infrared wavelength in the infrared wavelength range, and each of the third devices is configured to detect a third light having the at least the first infrared wavelength. For a substantially normally incident light and for each of mutually orthogonal first and second polarization states: for regions between the first openings, the first film has an average optical reflectance of greater than about 60% for each of the visible and infrared wavelength ranges, and the second film has an average optical reflectance of greater than about 60% for the visible wavelength range and an average optical transmittance of greater than about 50% for the infrared wavelength range.

In some aspects of the present description, a display system is provided, the display system including a first mirror defining a two-dimensional array of first openings therein, pluralities of visible light emitting devices and infrared light emitting devices disposed in the first openings of the first mirror, and a second mirror disposed on the first mirror and defining a two-dimensional array of second openings therein aligned with the first openings in a one-to-one correspondence. The visible light emitting devices are configured to emit visible light having at least one visible wavelength in a visible wavelength range extending from about 420 nm to about 680 nm, and the infrared light emitting devices are configured to emit infrared light having at least one infrared wavelength in an infrared wavelength range extending from about 850 nm to about 1050 nm. At least 70% of the visible light emitted by the visible light emitting devices, but no more than about 10% of the infrared light emitted by the infrared light emitting devices passes through the second openings. Regions of the first mirror between the first openings have an optical reflectance of greater than about 60% at each of the at least one visible wavelength and the at least one infrared wavelength. Regions of the second mirror between the second openings have an optical reflectance of greater than about 60% at the at least one visible wavelength and an optical transmittance of greater than about 50% at the at least one infrared wavelength.

BRIEF DESCRIPTION OF THE DRAWINGS

FIGS. 6A and 6B provide data on the transmission versus wavelength performance of an optical diffuser, in accordance with an embodiment of the present description.

DETAILED DESCRIPTION

Figure 1:
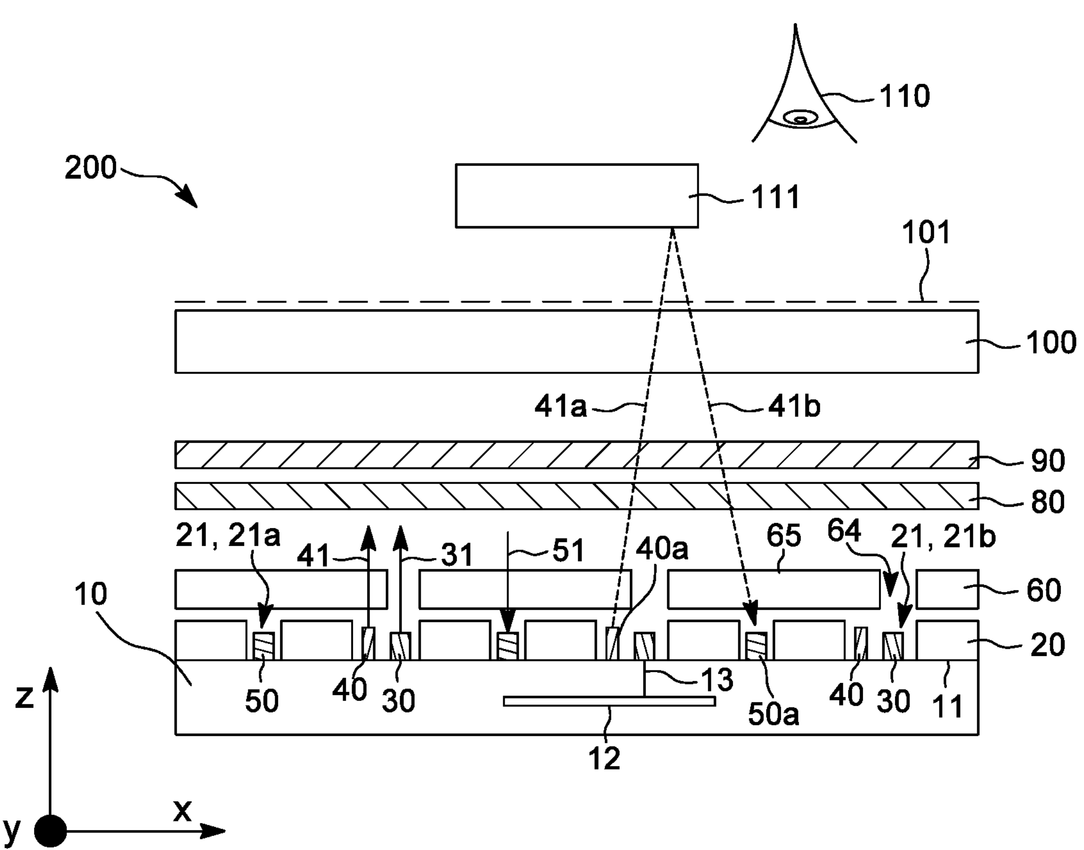
FIG. 1 is a side view of a display system with near infrared optical films, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Display and touch systems which utilize near infrared light (NIR) to detect the presence and status of objects (e.g., reading a fingerprint of a user) are becoming increasingly popular and available. However, the manufacture of these systems can be complex and the additional NIR components can add significant cost to the system. In addition to light sources (e.g., light emitting diodes) for the displayed image, these touch systems need near infrared light sources and near infrared sensors to be able to read objects on or near the display. These added components must be placed such that they do not interfere with the displayed image (i.e., do not interfere with the light from the light sources in the backlight), which often means adding layers and manufacturing complexity to the optical stacks.

According to some aspects of the present description, a display system which adds the near infrared light sources and sensors to the same backlight backplane as the visible-light light sources is provided, enabling a simple optical stack with the desired functions without adding significant thickness. In some embodiments, a display system may include a substrate, an optically reflecting first film, pluralities of visible light emitting first devices, infrared light emitting second devices, and infrared light detecting third devices, and an optically reflecting second film. In some embodiments, the substrate may include a circuit board with at least one electrically conductive trace which is electrically connected to at least one of the first, second and third devices.

In some embodiments, the optically reflecting first film may be disposed on a first major surface of the substrate and may define a plurality of spaced apart first openings (e.g., through-holes) therein arranged across a length and a width of the first major surface. In some embodiments, the pluralities of visible light emitting first devices, infrared light emitting second devices, and infrared light detecting third devices may be disposed in the first openings of the first film and mounted on the substrate.

In some embodiments, the plurality of spaced apart first openings may include pluralities of spaced apart first A openings and first B openings, wherein the light detecting third devices are disposed in the first A openings in a one-to-one correspondence, and pairs of the first and second devices are disposed in the first B openings in a one-to-one correspondence. In some embodiments, the first devices may be disposed in a first subset of the first B openings, and the second devices may be disposed in a second subset of the first B openings. Stated another way, in some embodiments, the first devices may be co-located with the second devices in the first B openings, and in other embodiments, the first devices may not be co-located with the second devices (i.e., each first B opening may have either a first device or a second device, but not both).

In some embodiments, the optically reflecting second film may be disposed on the pluralities of first, second, and third devices and the optically reflecting first film opposite the substrate. In some embodiments, the second film defines a plurality of spaced apart second openings. In such embodiments, the second film may cover each of the first openings that includes one of the third devices therein, and each of the second openings may be aligned with a corresponding one of the first openings that includes one of the first devices therein, so that the first light emitted by the corresponding first opening passes through the second opening. In some embodiments, the second film may cover the second devices so that no more than about 10%, or about 8%, or about 6%, or about 4%, or about 2%, or about 1% of the second light emitted by the second devices passes through the second openings.

In some embodiments, for a visible (i.e., human-visible) wavelength range extending from about 420 nm to about 680 nm and an infrared wavelength range extending from about 850 nm to about 1050 nm: each of the first devices may be configured to emit a first light having at least a first wavelength not in the infrared wavelength range, each of the second devices may be configured to emit a second light having at least a first infrared wavelength in the infrared wavelength range, and each of the third devices may be configured to detect a third light having the at least the first infrared wavelength.

In some embodiments, for a substantially normally incident light and for each of mutually orthogonal first and second polarization states: for regions between the first openings, the first film may have an average optical reflectance of greater than about 60%, or greater than about 70%, or greater than about 80%, or greater than about 90%, or greater than about 95%, or greater than about 98%, for each of the visible and infrared wavelength ranges, and the second film may have an average optical reflectance of greater than about 60%, or greater than about 70%, or greater than about 80%, or greater than about 90%, or greater than about 95%, or greater than about 98% for the visible wavelength range and an average optical transmittance of greater than about 50%, or greater than about 55%, or greater than about 60%, or greater than about 65%, or greater than about 70%, or greater than about 75%, or greater than about 80% for the infrared wavelength range.

In some embodiments, at least one of the first and second films may include a plurality of alternating different polymeric first and second layers numbering at least 10, or at least 20, or at least 50, or at least 75, or at least 100, or at least 150, or at least 200, or at least 250, or at least 300, or at least 400 in total. In some embodiments, each of the polymeric first and second layers may have an average thickness of less than about 500 nm, or less than about 400 nm, or less than about 350 nm, or less than about 300 nm, or less than about 250 nm, or less than about 200 nm. In some embodiments, the at least one of the first and second films may further include at least one skin layer having an average thickness of greater than about 500 nm, or about 750 nm, or about 1000 nm, or about 1500 nm, or about 2000 nm.

In some embodiments, the display system may further include an optical diffuser disposed on the second film and configured to scatter light in at least a portion of the visible wavelength range, such that for the substantially normally incident light: in the visible wavelength range, the optical diffuser may have an average specular transmittance Vs, and in the infrared wavelength range, the optical diffuser may have an average total transmittance It and an average specular transmittance Is, such that Is/It is greater than or equal to about 0.6, or about 0.65, or about 0.7, or about 0.75, or about 0.8, and Is/Vs is greater than or equal to about 2.5, or about 3, or about 3.5, or about 4. In such embodiments, for the substantially normally incident light and the visible wavelength range, the optical diffuser has an average total transmittance Vt, such that It/Vt is greater than about 1, or greater than about 1.5, or greater than about 2, or greater than about 2.5. In such embodiments, for the substantially normally incident light and the visible wavelength range, the ratio of It/Vt is less than about 5, or less than about 4.5, or less than about 4, or less than about 3.5, or less than about 3.

In some embodiments, the optical diffuser may be disposed on the second film and configured to scatter light in at least a portion of the visible wavelength range, such that for the substantially normally incident light: in the visible wavelength range, the optical diffuser may have an average specular transmittance Vs, and, in the infrared wavelength range, the optical diffuser may have an average total transmittance It and an average specular transmittance Is such that the ratio Is/It is greater than or equal to 0.3, or greater than or equal to 0.35, or greater than or equal to 0.4, or greater than or equal to 0.45, or greater than or equal to 0.5, or greater than or equal to 0.55, or greater than or equal to 0.6, or greater than or equal to 0.65, or greater than or equal to 0.7, and the ratio Is/Vs is greater than or equal to about 3, or about 3.5, or about 4, or about 4.5, or about 5.0. In such embodiments, for the substantially normally incident light and the visible wavelength range, the optical diffuser may have an average total transmittance. Vt, such that the ratio It/Vt is greater than about 0.7, or about 0.8, or about 0.9, or about 1, or about 1.1, or about 1.2, or about 1.25. In such embodiments, for the substantially normally incident light and the visible wavelength range, the ratio It/Vt may be less than about 2, or about 1.9, or about 1.8, or about 1.7, or about 1.6, or about 1.5, or about 1.4.

In some embodiments, the display system may further include a reflective polarizer, such that for the substantially normally incident light, the reflective polarizer may have an average optical transmittance of at least about 60%, or at least about 70%, or at least about 80%, or at least about 90%, or at least about 95% for the first polarization state (e.g., light polarized to the x-axis of the reflective polarizer) and an average optical reflectance of at least about 60%, or at least about 70%, or at least about 80%, or at least about 90%, or at least about 95% for the second polarization state (e.g., light polarized to the y-axis of the reflective polarizer).

In some embodiments, the display system may further include a display panel configured to generate an image for viewing by a user. In some embodiments, the second light emitted by at least one of the second devices may propagate toward and be incident on an object (e.g., a finger of a user, a stylus, etc.). In some embodiments, at least one of the third devices may be configured to at least sense a presence of the object by receiving at least a portion of the second light reflected by the object.

In some embodiments, the display system may include N1 first devices in total, N2 second devices in total, and N3 third devices in total, wherein, at least two of N1, N2, and N3 are different from each other. In some embodiments, N2 and N3 may both be less than N1.

According to some aspects of the present description, a display system may include a first mirror (e.g., a first reflective film) defining a two-dimensional array of first openings therein, pluralities of visible light emitting devices and infrared light emitting devices disposed in the first openings of the first mirror, and a second mirror (e.g., a second reflective film) disposed on the first mirror and defining a two-dimensional array of second openings therein aligned with the first openings in a one-to-one correspondence. In some embodiments, the visible light emitting devices may be configured to emit visible light having at least one visible wavelength in a visible wavelength range extending from about 420 nm to about 680 nm, and the infrared light emitting devices may be configured to emit infrared light having at least one infrared wavelength in an infrared wavelength range extending from about 850 nm to about 1050 nm.

In some embodiments, at least one pair of visible and infrared light emitting devices may be integrally formed with each other.

In some embodiments, at least about 70%, or at least about 75%, or at least about 80%, or at least about 85%, or at least about 90%, or at least about 95% of the visible light emitted by the visible light emitting devices, but no more than about 10% or no more than about 8%, or no more than about 6%, or no more than about 4%, or no more than about 2%, or no more than about 1% of the infrared light emitted by the infrared light emitting devices may pass through the second openings. In some embodiments, regions of the first mirror between the first openings may have an optical reflectance of greater than about 60%, or greater than about 70%, or greater than about 80%, or greater than about 90%, or greater than about 95%, or greater than about 98% at each of the at least one visible wavelength and the at least one infrared wavelength. In some embodiments, regions of the second mirror between the second openings may have an optical reflectance of greater than about 60%, or greater than about 70%, or greater than about 80%, or greater than about 90%, or greater than about 95%, or greater than about 98% at the at least one visible wavelength and an optical transmittance of greater than about 50%, or greater than about 55%, or greater than about 60%, or greater than about 65%, or greater than about 70%, or greater than about 75%, or greater than about 80% at the at least one infrared wavelength.

In some embodiments, the first and second openings may form two-dimensional regular arrays. In some embodiments, the first and second openings may form two-dimensional square, rectangular, hexagonal, or polygonal arrays.

Turning now to the figures, FIG. 1 is a side view of a display system with near infrared optical films according to the present description. In some embodiments, display system 200 includes a substrate 10, an optically reflecting first film 20 (or first mirror 20), and optically reflecting second film 60 (or second mirror 60), a plurality of visible light emitting first devices (or "first devices") 30, a plurality of infrared light emitting second devices (or "second devices") 40, and a plurality of infrared light detecting third devices (or "third devices") 50. Each of the first devices 30, second devices 40, and third devices 50 are disposed on and mounted to substrate 10. In some embodiments, substrate 10 includes a circuit board with at least one electrically conductive trace 12 electrically connected 13 to at least one of the first devices 30, second devices 40, and third devices 50.

Optically reflecting first film 20 is disposed on a first major surface 11 of substrate 10 and defines a plurality of spaced-apart first openings 21 arranged across the length (x-axis) and the width (y-axis) of the first major surface 11. In some embodiments, each of the first devices 30, second devices 40, and third devices 50 are disposed in one of the first openings 21 (e.g., first opening 21*b*). In some embodiments, third devices 50 are disposed in first openings 21 separate from first devices 30 and second devices 40 (e.g., first opening 21*a*). In some embodiments, first devices 30 and second devices 40 may be co-located in a same first opening 21*b*. In other embodiments, first devices 30 and second devices 40 may be separated, each in their own first opening 21. The total number of first devices 30 may be a number N1, the total number of second devices 40 may by N2, and the total number of third devices 50 may be N3. In some embodiments, at least two of N1, N2, and N3 are different from each other. In some embodiments, N2 and N3 may be less than N1.

In some embodiments, each of the first devices 30 may be configured to emit a first light 31 having at least a first wavelength in a visible wavelength range extending from about 420 nm to about 680 nm. In some embodiments, each of the second devices 40 may be configured to emit a second light 41 having at least a first infrared wavelength in an infrared wavelength range extending from about 850 nm to about 1050 nm. In some embodiments, each of the third devices 50 may be configured to detect a third light 51 including the at least first infrared wavelength.

In some embodiments, optically reflecting second film 60 may be disposed on the optically reflecting first film 20 and the pluralities of first devices 30, second devices 40, and third devices 50. In some embodiments, the optically reflecting second film 60 may define a plurality of spaced apart second openings 64. In some embodiments, the optically reflecting second film 60 is disposed such that it covers each of the first openings 21 (e.g., first opening 21*a*) that contains a third device 50 therein (i.e., none of the second openings 64 of the optically reflecting second film 60 are located over a first opening 21*a* containing a third device 50). In some embodiments, each of the second openings 64 is aligned with a corresponding one of the first openings 21 (e.g., 21*b*) that includes one of the first devices 30 therein, so that the first light 31 emitted by a first device 30 may pass through the second opening 64. In some embodiments, each of the second openings 64 may be a different size than the corresponding first opening 21. For example, the second openings 64 may be smaller than the corresponding first opening 21, as shown in FIG. 1. In such embodiments, the optically reflecting second film 60 may cover at least a portion of the second devices 40. In other embodiments, the second openings 64 may not cover at least a portion of the second devices 40 (i.e., only the first devices 30 need to be aligned with a second opening 64).

In some embodiments, the plurality of first openings 21 and the plurality of second openings 64 may form two-dimensional regular arrays. In some embodiments, the first openings 21 and second openings 64 may form two-dimensional square, rectangular, or hexagonal arrays.

In some embodiments, optically reflecting first film 20 and optically reflecting second film 20 have different optical properties. These properties are discussed in additional detail elsewhere herein (see, for example, the discussion of FIGS. 3A/3B and 4A/4B). However, a brief description is provided here. For a substantially normally incident light (i.e., a light that is substantially normal to the plane of the surface of the film), and for mutually orthogonal first and second polarization states (e.g., a first polarization state may be light linearly polarized to the x-axis of a film and a second polarization state may be light linearly polarized to the y-axis of a film), the first film 20 may have an average optical reflectance of greater than about 60%, or greater than about 70%, or greater than about 80%, or greater than about 90%, or greater than about 95%, or greater than about 98% for each of the visible and infrared wavelength ranges. For the normally incident light and the first and second polarization states, the second film 60 (and, specifically, the spaces 65 of the second film 60 where there are no openings) may have an average optical reflectance of greater than about 60%, or greater than about 70%, or greater than about 80%, or greater than about 90%, or greater than about 95%, or greater than about 98% for the visible wavelength range, and second film 60 may have an average optical transmittance of greater than about 50%, or greater than about 55%, or greater than about 60%, or greater than about 65%, or greater than about 70%, or greater than about 75%, or greater than about 80% for the infrared wavelength range. Stated another way, the first film 20 may reflect a substantial portion of light in both the visible and infrared wavelength ranges, and the second film 60 may reflect a substantial portion of visible light but transmit a substantial portion of infrared light.

Based on these optical properties, the plurality of spaced apart second openings 64 of optically reflecting second film 60 are disposed such that they have a one-to-one correspondence with the locations of the first devices 30, which allows visible first light 31 to be transmitted therethrough to provide illumination for a display 100. On the other hand, second devices 40 may be disposed such that they are not coincident with one of the second openings 64, as second light 41 emitted by second devices 40 is in the infrared wavelength range and is therefore substantially transmitted through optically reflecting second film 60. That is, in some embodiments, the second film 60 may cover the second devices 40 so that no more than about 10%, or about 8%, or about 6%, or about 4%, or about 2%, or about 1% of the second light 41 emitted by the second devices 40 passes through the second openings 64.

In another embodiment, second devices 40 may be disposed beneath one of the second openings 64, such that second light 41 passes through second opening 64. Third devices 50, however, may be placed such that they are not co-located with a second opening 64, such that only light in the infrared wavelength range is allowed to reach the third devices 50. In some embodiments, at least one pair of visible light emitting first devices 30 and infrared light emitting second devices 40 may be integrally formed with each other.

As an example, second device 40*a* may emit a second light 41*a*. Second light 41*a* may contain wavelengths of light in the infrared wavelength range, which is substantially transmitted through second film 60. In some embodiments, the display system 200 may further include a display panel 100 configured to generate an image 101 for viewing by a user 110. Second light 41*a* eventually passes through display 100 and is incident on object 111 (e.g., the finger of a user, a stylus, etc.) where it is reflected as reflected second light 41*b*. Reflected second light 41*b* is substantially transmitted by second film 60 and therefore at least a portion of reflected second light 41*b* becomes incident on third device 50*a*, which is configured to at least sense a presence of object 111. Reflected light in the visible wavelength range is substantially reflected by second film 60, does not reach third device 50*a*, and thus does not interfere with the reflected second light 41*b*.

In some embodiments, display system 200 may further include an optical diffuser 80 disposed on the second film 60. Optical diffuser 80 may be configured to scatter light in at least a portion of the visible wavelength range. In some embodiments, optical diffuser 80 may have an average specular transmittance. Vs, for wavelengths in the visible wavelength range which is different from an average specular transmittance, Is, for wavelengths in the infrared wavelength range. That is, optical diffuser 80 may be configured to diffuse wavelengths of visible light to a higher degree than wavelengths of infrared light. In some embodiments, for example, the ratio of Is/Vs may be greater than or equal to about 2.5, or about 3, or about 3.5, or about 4. In some embodiments, optical diffuser 80 may have an average total transmittance, It, such that the ratio Is/It is greater than or equal to about 0.6, or about 0.65, or about 0.7, or about 0.75, or about 0.8. In some embodiments, for substantially normally incident light, and for the visible wavelength range, the optical diffuser may have an average total transmittance, Vt, such that the ratio It/Vt is greater than about 1, or about 1.5, or about 2, or about 2.5. In some embodiments, the ratio It/Vt may also be less that about 5, or about 4.5, or about 4, or about 3.5, or about 3. Additional detail regarding the optical characteristics of the optical diffuser embodiment described above, including values for Vt (average total transmittance, visible), Vs (average specular transmittance, visible), Vd (average diffuse transmittance, visible), It (average total transmittance, infrared), Is (average specular transmittance, infrared), and Id (average diffuse transmittance, infrared) may be found in FIGS. 6A-6B.

Figures 7A, 7B:
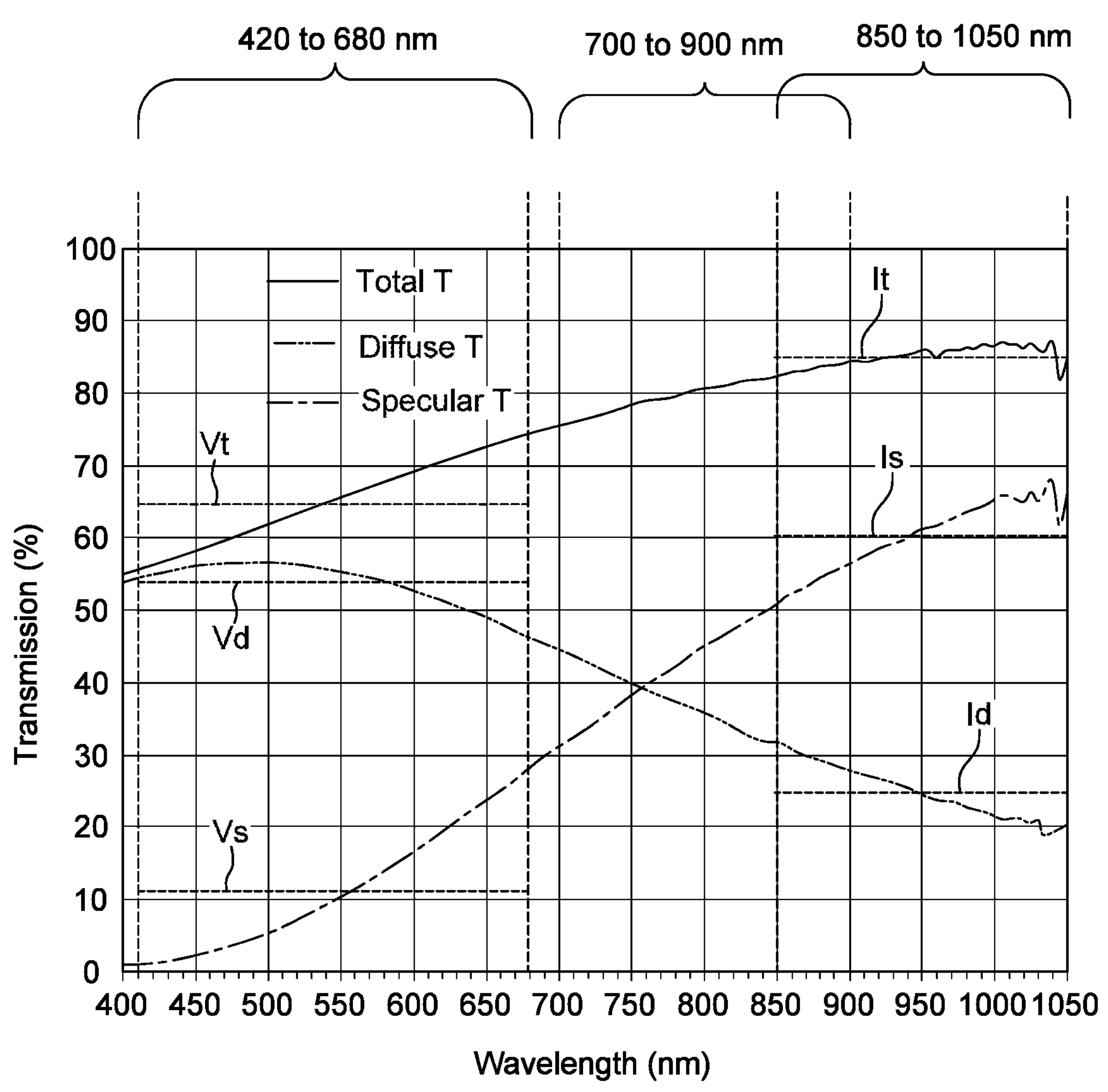
FIGS. 7A and 7B provide data on the transmission versus wavelength performance of an optical diffuser, in accordance with an alternate embodiment of the present description.

In some embodiments, the optical diffuser 80 may have different optical properties, such as those shown in FIGS. 7A-7B. In this alternate embodiment, the ratio of Is/It may be greater than or equal to about 0.3, or about 0.35, or about 0.4, or about 0.45, or about 0.5, or about 0.55, or about 0.6, or about 0.65, or about 0.7, and the ratio of Is/Vs is greater than or equal to about 3, or about 3.5, or about 4, or about 4.5, or about 5.0. In this embodiment, the optical diffuser may also have an average total transmittance Vt, such that the ratio It/Vt is greater than about 0.7, or about 0.8, or about 0.9, or about 1, or about 1.1, or about 1.2, or about 1.25, and the ratio It/Vt is also less than about 2, or about 1.9, or about 1.8, or about 1.7, or about 1.6, or about 1.5, or about 1.4.

In some embodiments, the display system 200 may further include a reflective polarizer 90. In some embodiments, for substantially normally incident light, the reflective polarizer may have an average optical transmittance of at least 60%, or at least 70%, or at least 80%, or at least 90%, or at least 95% for the first polarization state (e.g., light polarized to the x-axis) and an average optical reflectance of at least 60%, or at least 70%, or at least 80%, or at least 90%, or at least 95% for the second polarization state (e.g., light polarized to the y-axis).

Figure 2:
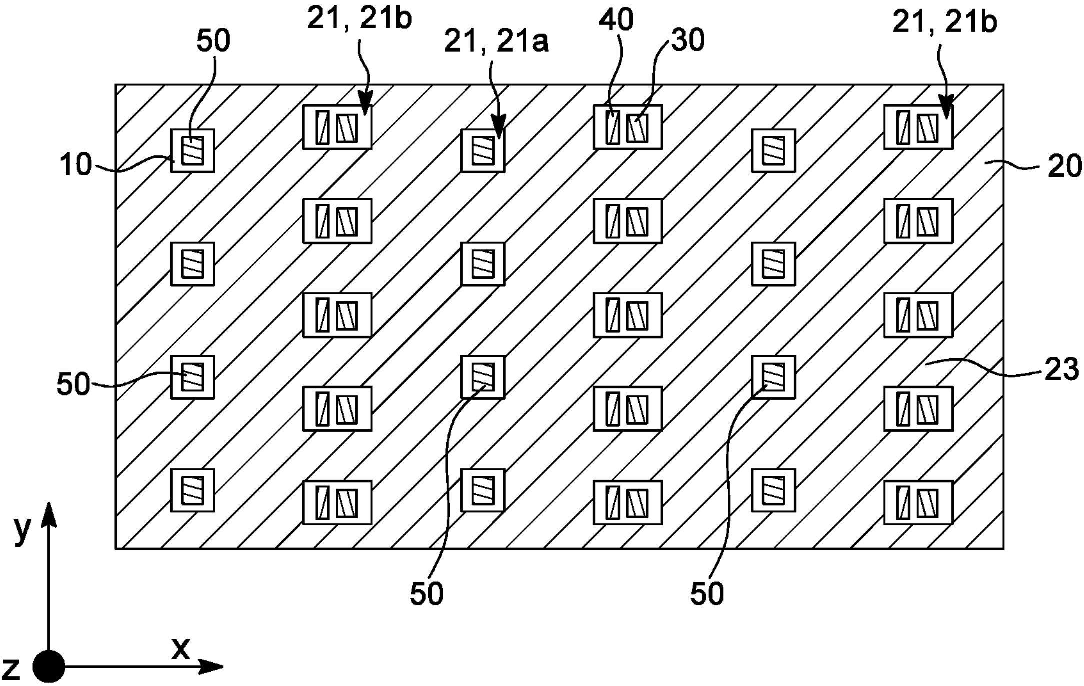
FIG. 2 is a plan view of a portion of the display system of FIG. 1 a near infrared optical film with openings, in accordance with an embodiment of the present description.

FIG. 2 is a plan view of a portion of the display system of FIG. 1, showing one embodiment of the first film 20 disposed on substrate 10 including first openings 21. In this embodiment, the first openings 21 includes a set of first A openings (21*a*) and first B opening (21*b*). In this embodiment, third devices 50 are disposed in the A openings 21*a* and pairs of the first devices 30 and second devices 40 are disposed in the B openings 21*b*. Spaces 23 between openings 21 are substantially reflective in both the visible wavelength range and the infrared wavelength range. Stated another way, the first film 20 (and, in particular, spaces 23 where there are no openings 21) is a reflective mirror film which substantially reflects wavelengths of light in both the visible and infrared wavelength ranges.

Figures 3A, 3B:
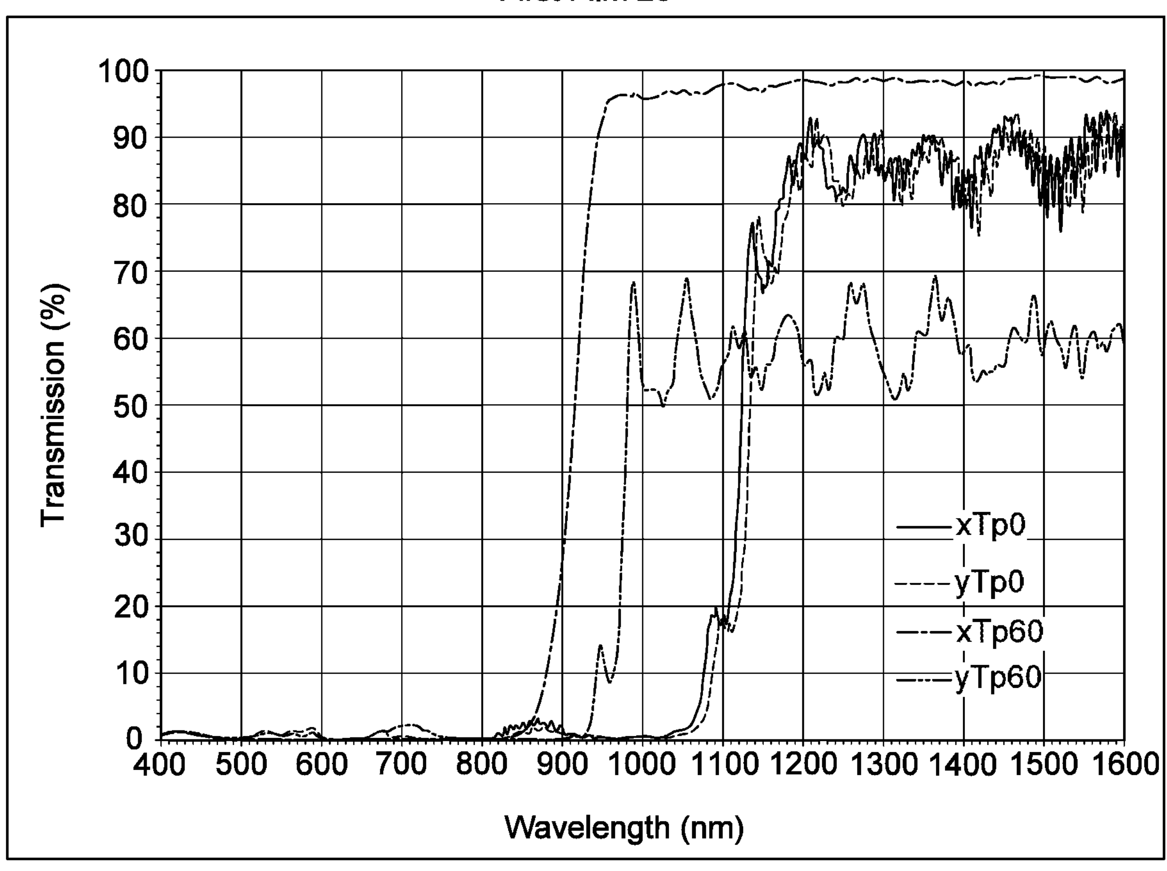
FIGS. 3A and 3B provide data on the transmission versus wavelength performance of an optically reflecting first film which substantially reflects visible and near infrared wavelengths, in accordance with an embodiment of the present description.

FIGS. 3A and 3B provide data on the transmission versus wavelength performance of one embodiment of the first film 20 of FIG. 1 which substantially reflects wavelengths and polarizations of light including both visible and near infrared wavelengths. The four plotlines on the graph of FIG. 3A may be described as follows.

Plot xTp0 shows the optical transmission percentage for light polarized to the x-axis of second film 60 and incident on first film 20 at an angle of incidence of 0 degrees from the vertical (i.e., substantially normal to the surface of first film 20).

Plot yTp0 shows the optical transmission percentage for light polarized to the y-axis of first film 20 and incident on first film 20 at an angle of incidence of 0 degrees from the vertical (i.e., substantially normal to the surface of first film 20).

Plot xTp60 shows the optical transmission percentage for light polarized to the x-axis of first film 20 and incident on first film 20 at an angle of incidence of about 60 degrees from the vertical.

Plot yTp60 shows the optical transmission percentage for light polarized to the y-axis of first film 20 and incident on first film 20 at an angle of incidence of about 60 degrees from the vertical.

FIG. 3B is a table showing average transmission percentages for each of the four plot lines described above versus wavelength range. As discussed elsewhere herein, for substantially normally incident light (light with an incident angle of about 0 degrees) and for each of mutually orthogonal first and second polarization states (light polarized to either the x-axis or the y-axis), the embodiment of first film 20 shown in FIG. 3A has an average optical reflectance of 0.59% for xTp0 and 0.44% for yTp0 for light in the visible wavelength range extending from about 420 nm to about 680 nm. Similarly, for substantially normally incident light (light with an incident angle of about 0 degrees) and for each of mutually orthogonal first and second polarization states (light polarized to either the x-axis or the y-axis), the embodiment of first film 20 shown in FIG. 3A has an average optical reflectance of 1% for xTp0 and 0.66% for yTp0 for light in the infrared wavelength range extending from about 850 nm to about 1050 nm.

Figures 4A, 4B:
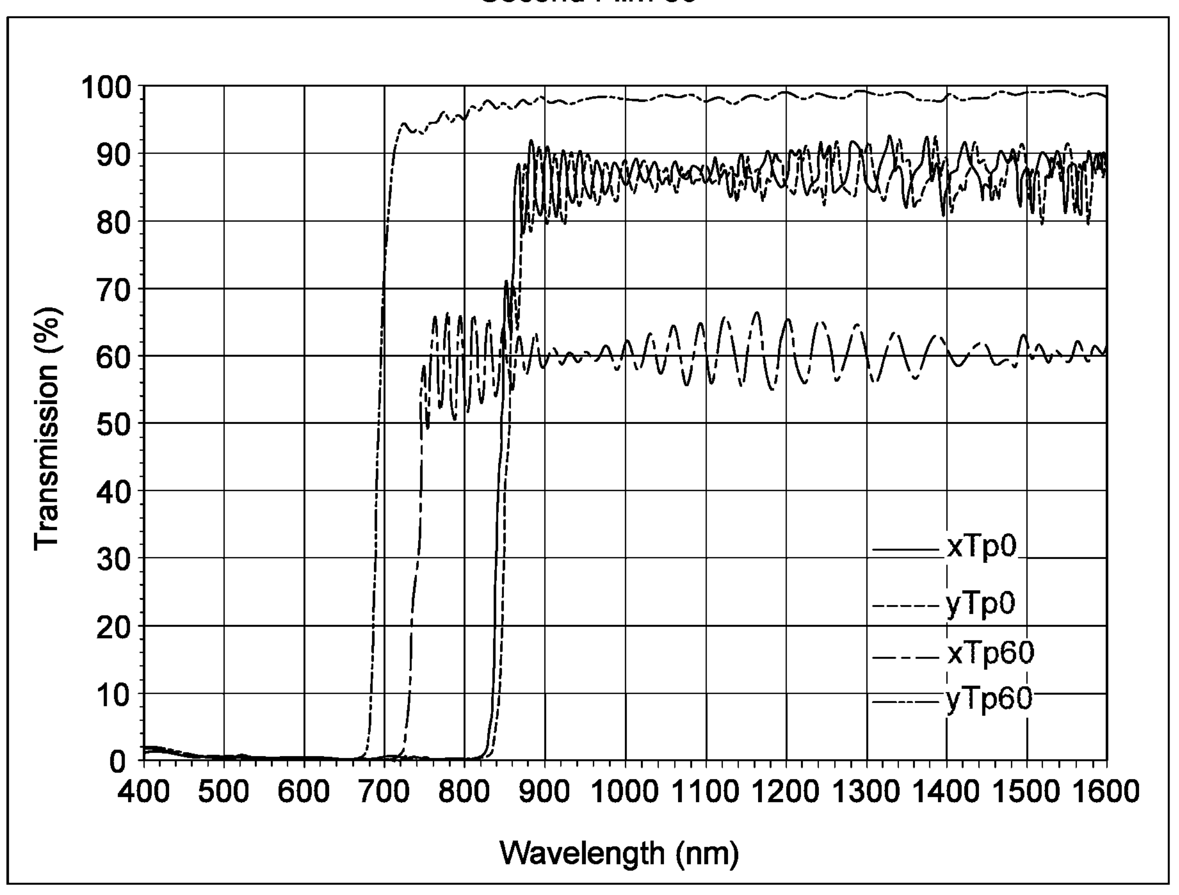
FIGS. 4A and 4B provide data on the transmission versus wavelength performance of an optically reflecting second film allowing transmission of near infrared wavelengths, in accordance with an embodiment of the present description.

FIGS. 4A and 4B provide data on the transmission versus wavelength performance of one embodiment of the second film 60 of FIG. 1 allowing transmission of at least some wavelengths and polarizations of light including near infrared wavelengths. The four plotlines on the graph of FIG. 4A may be described as follows.

Plot xTp0 shows the optical transmission percentage for light polarized to the x-axis of second film 60 and incident on second film 60 at an angle of incidence of 0 degrees from the vertical (i.e., substantially normal to the surface of second film 60).

Plot yTp0 shows the optical transmission percentage for light polarized to the y-axis of second film 60 and incident on second film 60 at an angle of incidence of 0 degrees from the vertical (i.e., substantially normal to the surface of second film 60).

Plot xTp60 shows the optical transmission percentage for light polarized to the x-axis of second film 60 and incident on second film 60 at an angle of incidence of about 60 degrees from the vertical.

Plot yTp60 shows the optical transmission percentage for light polarized to the y-axis of second film 60 and incident on second film 60 at an angle of incidence of about 60 degrees from the vertical.

FIG. 4B is a table showing average transmission percentages for each of the four plot lines described above versus wavelength range. As discussed elsewhere herein, for substantially normally incident light (light with an incident angle of about 0 degrees) and for each of mutually orthogonal first and second polarization states (light polarized to either the x-axis or the y-axis), the embodiment of second film 60 shown in FIG. 4A has an average optical transmission of 0.42% for xTp0 and 0.50% for yTp0 for light in the visible wavelength range extending from about 420 nm to about 680 nm. On the other hand, for substantially normally incident light (light with an incident angle of about 0 degrees) and for each of mutually orthogonal first and second polarization states (light polarized to either the x-axis or the y-axis), the embodiment of second film 60 shown in FIG. 4A has an average optical transmission of 82.82% for xTp0 and 85.09% for yTp0 for light in the infrared wavelength range extending from about 850 nm to about 1050 nm.

Figure 5:
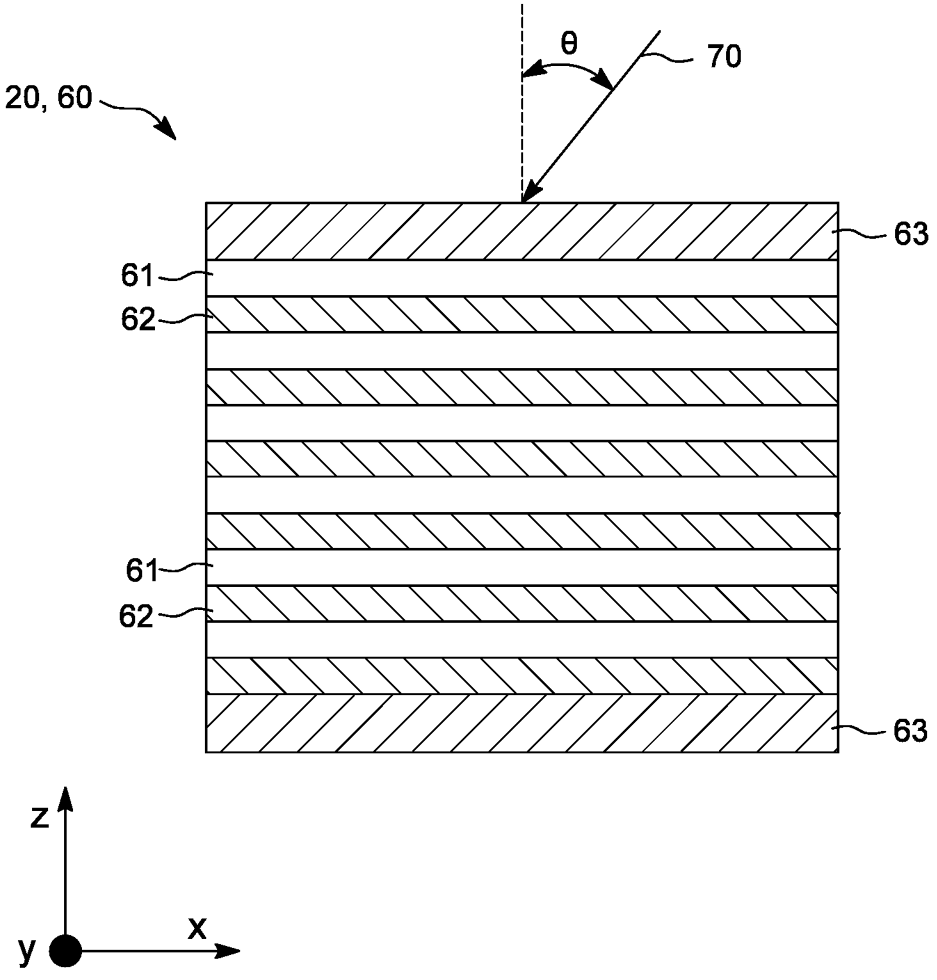
FIG. 5 provides a side view of the layered construction of a multilayer optical film, in accordance with an embodiment of the present description.

FIG. 5 provides a side view of the layered construction of a multilayer optical film, including first film 20 and second film 60 of the embodiment of FIG. 1. In some embodiments, at least one of the first film 20 and second film 60 include a plurality of alternating different polymeric first layers 61 and second layers 62 numbering at least 10, or at least 20, or at least 50, or at least 75, or at least 100, or at least 150, or at least 200, or at least 250, or at least 300, or at least 400 in total. In some embodiments, each of the polymeric first layers 61 and second layers 62 may have an average thickness of less than about 500 nm, or about 400 nm, or about 350 nm, or about 300 nm, or about 250 nm, or about 200 nm. In some embodiments, polymeric first layers 61 may have an index of refraction which differs from the index of refraction of polymeric second layers 62. By configuring the index of refraction, thickness, and orientation of alternating polymeric first layers 61 and polymeric second layers 62, it is possible to create optical films which have characteristics such as those shown in FIGS. 3A and 4A. As discussed elsewhere herein, these characteristics may be different for incident light 70, based on the value of the angle of incidence, θ. For example, the plots for lines xTp60 and yTp60 (having a value for θ of 60 degrees) in FIGS. 3A and 4A are different from the plots for lines xTp0 and yTp0 (having a value of θ of 0 degrees). In some embodiments, the at least one of the first film 20 and second film 60 may further include at least one skin layer 63, which may have an average thickness of greater than about 500 nm, or about 750 nm, or about 1000 nm, or about 1500 nm, or about 2000 nm.

FIGS. 6A and 6B provide data on the transmission versus wavelength performance of a first embodiment of an optical diffuser, such as optical diffuser 80 of FIG. 1. FIGS. 7A and 7B provide data on the transmission versus wavelength performance of a second embodiment of optical diffuser 80.

FIG. 6A shows plot lines showing the total transmission percentages, diffuse transmission percentages, and specular transmission percentages for a first embodiment of an optical diffuser 80. The average values for total transmission (Vt), diffuse transmission (Vd), and specular transmission (Vs) for light in the visible wavelength range extending from about 420 nm to about 680 nm is shown by the horizontal dashed lines in FIG. 6A, and summarized in the table in FIG. 6B. Similarly, the average values for total transmission (It), diffuse transmission (Id), and specular transmission (Is) for light in the infrared wavelength range extending from about 850 nm to about 1050 nm are shown by additional horizontal dashed lines in FIG. 6A, and also summarized in the table in FIG. 6B.

Using the average transmission values in FIG. 6B, it can be determined that the ratio of Is/Vs is 58.71 divided by 13.95, or approximately 4.2. Also, it can be determined that the ratio of Is/It is 58.71 divided by 69.93, or approximately 0.84, and the ratio It/Vt is 69.93 divided by 24.83, or approximately 2.8.

FIG. 7A shows plot lines showing the total transmission percentages, diffuse transmission percentages, and specular transmission percentages for a second, alternate embodiment of an optical diffuser 80. The average values for total transmission (Vt), diffuse transmission (Vd), and specular transmission (Vs) for light in the visible wavelength range extending from about 420 nm to about 680 nm is shown by the horizontal dashed lines in FIG. 7A, and summarized in the table in FIG. 7B. Similarly, the average values for total transmission (It), diffuse transmission (Id), and specular transmission (Is) for light in the infrared wavelength range extending from about 850 nm to about 1050 nm are shown by additional horizontal dashed lines in FIG. 7A, and also summarized in the table in FIG. 7B.

Using the average transmission values in FIG. 7B, it can be determined that the ratio of Is/Vs is 60.24 divided by 11.82, or approximately 5.1. Also, it can be determined that the ratio of Is/It is 60.24 divided by 85.09, or approximately 0.71, and the ratio It/Vt is 85.09 divided by 65.51, or approximately 1.3.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed:

1. A display system comprising:

a substrate;

an optically reflecting first film disposed on a first major surface of the substrate and defining a plurality of spaced apart first openings therein arranged across a length and a width of the first major surface;

pluralities of visible light emitting first devices, infrared light emitting second devices, and infrared light detecting third devices disposed in the first openings of the first film and mounted on the substrate; and an optically reflecting second film disposed on the pluralities of first, second, and third devices and the optically reflecting first film opposite the substrate, such that for a visible wavelength range extending from about 420 nm to about 680 nm and an infrared wavelength range extending from about 850 nm to about 1050 nm:

each of the first devices is configured to emit a first light having at least a first wavelength not in the infrared wavelength range;

each of the second devices is configured to emit a second light having at least a first infrared wavelength in the infrared wavelength range;

each of the third devices is configured to detect a third light having the at least the first infrared wavelength; and for a substantially normally incident light and for each of mutually orthogonal first and second polarization states:

for regions between the first openings, the first film has an average optical reflectance of greater than about 60% for each of the visible and infrared wavelength ranges; and the second film has an average optical reflectance of greater than about 60% for the visible wavelength range and an average optical transmittance of greater than about 50% for the infrared wavelength range.

2. The display system of claim 1, wherein the substrate comprises a circuit board comprising at least one electrically conductive trace electrically connected to at least one of the first, second and third devices.

3. The display system of claim 1, wherein the plurality of spaced apart first openings comprises pluralities of spaced apart first A and first B openings, wherein the third devices are disposed in the first A openings in a one-to-one correspondence, and pairs of the first devices and second devices are disposed in the first B openings in a one-to-one correspondence.

4. The display system of claim 1, wherein at least one of the first film and the second film comprises a plurality of alternating different polymeric first and second layers numbering at least 10 in total, each of the polymeric first and second layers having an average thickness of less than about 500 nm.

5. The display system of claim 4, wherein the at least one of the first film and the second film further comprises at least one skin layer having an average thickness of greater than about 500 nm.

6. The display system of claim 1 further comprising an optical diffuser (80) disposed on the second film and configured to scatter light in at least a portion of the visible wavelength range, such that for the substantially normally incident light (70):

in the visible wavelength range, the optical diffuser has an average specular transmittance Vs; and in the infrared wavelength range, the optical diffuser has an average total transmittance It and an average specular transmittance Is, $Is/It \geq 0.6$, $Is/Vs \geq 2.5$.

7. The display system of claim 6, wherein for the substantially normally incident light and the visible wavelength range, the optical diffuser has an average total transmittance Vt, $It/Vt > 1$.

8. The display system of claim 7, wherein for the substantially normally incident light and the visible wavelength range, $It/Vt < 5$.

9. The display system of claim 1 further comprising a reflective polarizer, such that for the substantially normally incident light, the reflective polarizer has an average optical transmittance of at least 60% for the first polarization state and an average optical reflectance of at least 60% for the second polarization state.

10. The display system of claim 1 further comprising a display panel configured to generate an image for viewing by a user, the second light emitted by at least one of the second devices propagating toward and incident on an object, at least one of the third devices configured to at least sense a presence of the object by receiving at least a portion of the second light reflected by the object.

11. The display system of claim 10, wherein the object comprises a finger of the user.

12. The display system of claim 10, wherein the object comprises a stylus.

13. The display system of claim 1, wherein the second film defines a plurality of spaced apart second openings therein, wherein:

the second film covers each of the first openings that comprises one of the third devices therein; and each of the second openings is aligned with a corresponding one of the first openings that comprises one of the first devices therein, so that the first light emitted by the corresponding first opening passes through the second opening.

14. The display system of claim 13, wherein the second film covers the second devices so that no more than about 10% of the second light emitted by the second devices passes through the second openings.

15. The display system of claim 1 further comprising an optical diffuser disposed on the second film and configured to scatter light in at least a portion of the visible wavelength range, such that for the substantially normally incident light:

in the visible wavelength range, the optical diffuser has an average specular transmittance Vs; and in the infrared wavelength range, the optical diffuser has an average total transmittance It and an average specular transmittance Is, $Is/It \geq 0.3$, $Is/Vs \geq 3$.

16. The display system of claim 15, wherein for the substantially normally incident light and the visible wavelength range, the optical diffuser has an average total transmittance Vt, $It/Vt > 0.7$.

17. The display system of claim 16, wherein for the substantially normally incident light and the visible wavelength range, $It/Vt < 2$.

18. The display system of claim 1 comprising N1 first devices in total, N2 second devices in total, and N3 third devices in total, wherein, at least two of N1, N2, and N3 are different from each other.

19. The display system of claim 18, wherein N2 and N3 are less than N1.

20. A display system comprising:

a first mirror defining a two-dimensional array of first openings therein;

pluralities of visible light emitting devices and infrared light emitting devices disposed in the first openings of the first mirror, the visible light emitting devices configured to emit visible light having at least one visible wavelength in a visible wavelength range extending from about 420 nm to about 680 nm, the infrared light emitting devices configured to emit infrared light having at least one infrared wavelength in an infrared wavelength range extending from about 850 nm to about 1050 nm; and a second mirror disposed on the first mirror and defining a two-dimensional array of second openings therein aligned with the first openings in a one-to-one correspondence, such that at least 70% of the visible light emitted by the visible light emitting devices, but no more than about 10% of the infrared light emitted by the infrared light emitting devices passes through the second openings;

wherein, regions of the first mirror between the first openings have an optical reflectance of greater than about 60% at each of the at least one visible wavelength and the at least one infrared wavelength; and wherein, regions of the second mirror between the second openings have an optical reflectance of greater than about 60% at the at least one visible wavelength and an optical transmittance of greater than about 50% at the at least one infrared wavelength.

* * * * *